July 9, 1963 J. A. DAVIES 3,097,250
HYDROCARBON CONVERSION PROCESS
Filed June 28, 1960
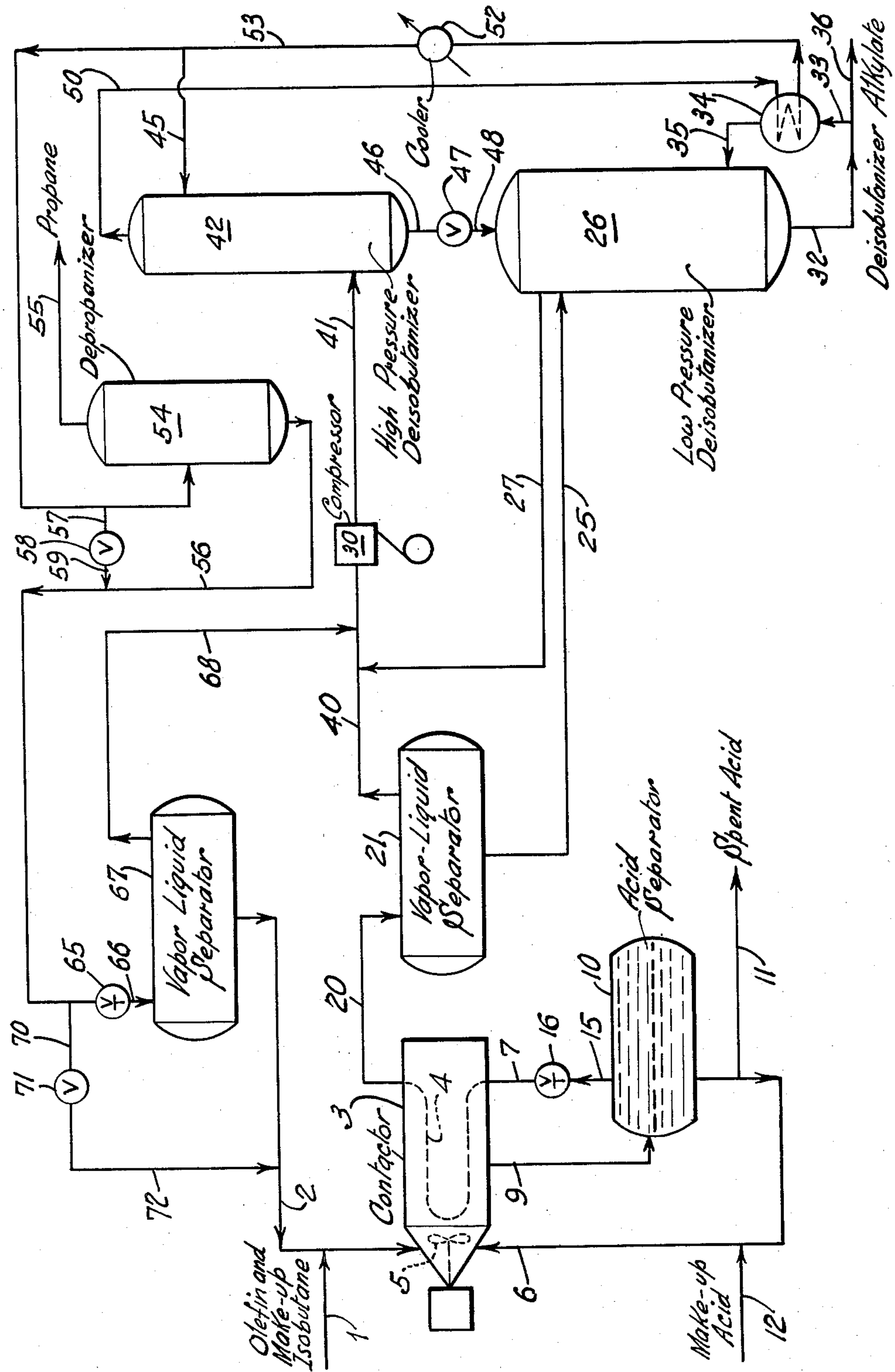

United States Patent Office 3,097,250

Patented July 9, 1963

3,097,250

HYDROCARBON CONVERSION PROCESS

James A. Davies, Scarsdale, N.Y., assignor to Texaco Inc., New York, N.Y., a corporation of Delaware Filed June 28, 1960, Ser. No. 39,370
7 Claims. (Cl. 260—683.62)

This invention is directed to an improvement in the alkylation of olefin-based alkylatable material with isoparaffin in the presence of an alkylation catalyst. More particularly it is directed to an alkylation process wherein a liquid hydrocarbon component of the reaction mixture is evaporated under conditions effective for refrigerating the alkylation zone thereby producing an isobutane rich vapor fraction and a remaining liquid fraction. The remaining liquid is passed to a low temperature, low pressure deisobutanizing fractional distillation zone. The isobutane rich vapor is compressed and passed to a high pressure deisobutanizing fractional distillation zone. Over head vapor from the high pressure deisobutanization zone is passed in indirect heat exchange with distilland in the low pressure deisobutanizing fractional distillation zone thereby providing reboiler heat for the latter zone and cooling the overhead vapors.

In the catalytic alkylation of olefinic material with isoparaffin, a preponderance of isoparaffin, for example, as much as 60 to 80 volume percent or more of the hydrocarbons in the reaction mixture, is used to direct the reaction toward production of the most valuable aviation and automotive fuels. Subsequently, a large quantity of isoparaffin must be recovered and recycled for reuse in the process. The mol ratio of isoparaffin to olefin-based material supplied to the alkylation zone is maintained substantially in excess of 1:1, and preferably in the range of about 4 to about 20:1. Isobutane is generally used as the isoparaffin for the manufacture of aviation or motor fuels although other isoparaffins, for example, isopentane, may be employed. For convenience and clarity, the invention will be described in terms of alkylation with isobutane, although it will be obvious that other isoparaffins may be employed in whole or in part.

The catalyst to liquid hydrocarbon volume ratio is maintained within the range of about 0.5 to 1 to about 5:1 and preferably within the range of about 1 to about 3:1. Catalyst strength is maintained at least about 88 percent when sulfuric acid is used, at least about 85 percent acidity when hydrogen fluoride is used or at least about 15 weight percent (expressed as equivalent aluminum) when aluminum chloride-hydrocarbon complex liquid catalyst is used. A liquid catalyst which is non-volatile under alkylating conditions, for example, sulfuric acid, is preferred. Sulfuric acid is maintained within the range of about 85 to 95 percent by purging spent acid from the system and by adding makeup acid of about 98 to 99.9 percent concentration. For convenience and clarity, the invention will be described in terms of alkylation with sulfuric acid catalyst, although it will be obvious that other catalysts are also applicable.

The alkylatable material reacted with the isoparaffin is olefin based, that is, it is usually an olefinic hydrocarbon itself such as propylene, butylene or the like, or it may be an alkyl ester, for example, an alkyl sulfate or fluoride as is produced in the so-called two-stage alkylation process.

The isobutane and olefinic material are contacted with a catalyst in the liquid phase at a temperature below about 100° F. With sulfuric acid catalyst, alkylation temperatures below about 75° F. are usually employed and temperatures within the range of about 30 to 55° F. are preferred. The alkylation reaction is exothermic and cooling of the alkylation zone is necessary in order to maintain desired temperatures. Refrigeration may be effectively provided by evaporating a part of the hydrocarbon component of the reaction mixture. This method of cooling not only provides the necessary refrigeration but effects separation of a body of isobutane-rich vapor which may be employed to provide a part of the isobutane required in the reaction zone. Cooling of the alkylation zone and separation of isobutane-rich vapor may be affected in an autorefrigeration system or in an effluent refrigeration system. In autorefrigeration, a part of the reaction mixture within the reaction zone is evaporated. In effluent refrigeration, the reaction zone is maintained at a pressure sufficient to maintain all of the reactants in the liquid phase. At least a part of the liquid reaction mixture withdrawn from the alkylation zone is passed to a zone of lower pressure evaporating a portion of the low boiling hydrocarbons and chilling the resulting liquid and vapor. This evaporation upon pressure release is called flashing, and cooling is achieved by substantially adiabatic expansion. Flash chilled material is passed in indirect heat exchange with the contents of the reaction zone where additional low boiling components are evaporated. Either autorefrigeration or effluent refrigeration may be termed "self refrigeration" since a part of the reaction mixture is vaporized affecting cooling of the reaction zone. In each case, a body of isobutane-rich vapor is produced in cooling the alkylation reaction zone.

Since the reaction mixture is predominantly isobutane, the hydrocarbons evaporated in refrigerating the alkylation are also predominantly isobutane, although they will also include a large proportion of the propane present and a small amount of normal butane. This stream is compressed to a pressure within the range of about 50 to 150 pounds per square inch gage and is passed to a small high pressure deisobutanizing fractional distillation zone to separate the isobutane from higher boiling components.

The unvaporized liquid remaining after evaporating the lower boiling hydrocarbons in refrigerating the alkylation zone comprises a large amount of isobutane, most of the normal butane and substantially all of the higher boiling hydrocarbons including the alkylate product. This liquid is passed to a low temperature low pressure deisobutanizer operated at a pressure within the range of about 0 to 50 pounds per square inch gage. Since this liquid is cold, it is preferably introduced at the top tray of the deisobutanizer. Bottoms liquid from the high pressure deisobutanizer is also passed to the low pressure deisobutanizer at or near the top tray. Overhead vapor from the low pressure deisobutanizer is not condensed as in usual distillation practice but is compressed and passed to the high pressure deisobutanizer. Compression may be effected in the same equipment used in handling the refrigeration vapors or may be effected in separate compression facilities.

Overhead vapor from the high pressure deisobutanizer is passed in indirect heat exchange with distilland in the low pressure deisobutanizer, thereby providing reboiler heat to the deisobutanizer and cooling and condensing at least a part of the vapor. The top tower temperature of the high pressure deisobutanizer is maintained at least 20° F. above the bottom tower temperature of the low pressure deisobutanizer to provide an adequate temperature differential for efficient heat transfer in the low pressure deisobutanizer reboiler. The cooled stream may be further cooled in conventional condensers if necessary to effect total condensation. A part of the resulting condensate is passed as reflux to the high pressure deisobutanizer and at least a part of the remaining condensate is returned to the alkylation zone to supply isobutane thereto. The condensate is desirably depropanized at least in part before return to the alkylation zone to eliminate propane from the alkylation system. The condensate may be chilled by flashing to a lower pressure in which case the evaporated hydrocarbons may be recondensed separately or may be included with the refrigeration vapors from the alkylation refrigeration or with the low pressure deisobutanizer vapors.

In accordance with the present invention, the method of handling the vapor from the self refrigeration of the alkylation zone and the handling of the remaining liquid is integrated effecting economies in utilities consumption as well as providing means for alkylation under conditions avoiding corrosion problems. In accordance with this process, the product liquid is deisobutanized at a low temperature and low pressure not heretofore thought practicable. The heat of compression of the compressed vapor is utilized to provide heat for rectification of the evaporated hydrocarbons in a high pressure deisobutanization zone, and the overhead vapor is used to supply reboiler heat to effect stripping of isobutane from the liquid products in a low pressure deisobutanization zone. The use of low pressure and the use of cold reactor effluent as reflux permits the low pressure deisobutanization fractional distillation tower to be operated at an unusually low temperature.

In the processes of the prior art, the liquid product is neutralized before separation of the isobutane to prevent decomposition of esters or other acidic components which cause corrosion and lower the qualities of the product. This decomposition occurs in the reboilers when operated to distill the large amount of isobutane and provide reflux which may be condensed with conventional water cooling facilities.

Because of the low temperature of the deisobutanization in accordance with the process of this invention, decomposition of acidic components of the alkylate liquid does not occur, and it is therefore unnecessary to neutralize the liquid stream before deisobutanization. Since the deisobutanization separates the major part of the hydrocarbon from the liquid stream, the remaining liquid is a relatively small fraction, and neutralization may be applied to it more efficiently with saving in chemicals. Since neutralization and water washing are unnecessary, dissolved and entrained water do not enter the deisobutanization system and no water vapor appears in the isobutane separated in the deisobutanization step. The elimination of water vapor from this stream substantially reduces corrosion which would otherwise occur in the vapor handling facilities, particularly the refrigeration compression and condensing system. Such corrosion may occur upon mixing of gases containing water vapor with the hydrocarbons evaporated from the reaction mixture. The hydrocarbon stream evaporated from the reaction mixture contains acidic catalyst degradation products. These acidic vapors are harmless so long as the system is kept free of water or water vapor. Although a dry acidic stream or a wet neutral stream are not corrosive when handled separately, their mixture creates a very corrosive condition.

The accompanying drawings diagrammatically illustrate the process of this invention. Although the drawings illustrate one arrangement of apparatus in which the process of this invention may be practiced, it is not intended to limit the invention to the particular apparatus or materials described.

Referring to the FIGURE, hydrocarbon feed including olefin and isobutane is introduced through line 1 with recycle isobutane from line 2 into contactor 3. Contactor 3 comprises a reaction zone provided with cooling coil 4 and impeller 5. Recycle acid catalyst is introduced through line 6. The hydrocarbon and acid are circulated in the reaction zone by means of impeller 5 forming an emulsified reaction mixture of hydrocarbon and acid. A part of the reaction mixture is continuously withdrawn from contactor 3 through line 9 and discharged to settler 10. Settler 10 comprises a quiescent settling zone wherein the emulsion breaks and hydrocarbon and acid phases separate. Acid is withdrawn from the bottom of the settler to line 6 for recycle to the contactor. Part of the circulating acid stream is withdrawn through line 11 and makeup acid is introduced through line 12 to maintain system acidity and high catalyst activity.

Hydrocarbon liquid is withdrawn from the upper layer in settler 10 through line 15 and passed through throttle valve 16 and line 17 into cooling coil 4. The liquid passing through throttle valve 16 is flashed concomitantly, vaporizing a part of the liquid and chilling the resulting liquid-vapor mixture. The liquid-vapor mixture passing through coil 4 absorbs reaction heat effecting vaporization of additional liquid in the liquid-vapor mixture. Vapor and remaining liquids are discharged from coil 4 through line 20 to separator 21.

Liquid separated in separator 21 is withdrawn through line 25 and passed to the top tray of low pressure deisobutanizer 26. Low pressure deisobutanizer 26 is a fractional distillation column operated at a pressure within the range of about 0 to 50 pounds per square inch gage. Overhead vapor is withdrawn through line 27 combined with vapors from lines 40 and 68 and passed to compressor 30. Deisobutanized liquid is withdrawn from the bottom of low pressure deisobutanizer 26 through line 32, and a portion is recirculated through line 33, reboiler 34 and line 35 to supply heat for the distillation in deisobutanizer 26. The remaining deisobutanized liquid comprising normal butane and heavier hydrocarbons including alkylate is discharged through line 36 to neutralization and distillation facilities for the separation of normal butane and alkylate product.

Vapor from separator 21 is withdrawn through line 40, combined with hydrocarbon vapors from lines 27 and 68 and passed to compressor 30. Compressed vapor which has been heated by substantially adiabatic compression is discharged through line 41 and is passed to high pressure deisobutanizer 42 at a pressure within the range of about 50 to 150 pounds per square inch gage. Liquid downflow in high pressure deisobutanizer 42 is provided by reflux introduced through line 45. Liquid product is withdrawn from the bottom of high pressure deisobutanizer 42 through line 46 and valve 47 and is discharged through line 48 to low pressure deisobutanizer 26. Overhead vapor is withdrawn through line 50 and is passed through the reboiler 34 in indirect heat exchange with distilland therein. Cooled high pressure deisobutanizer overhead is discharged from reboiler 34 through line 51 and cooler 52 for condensation of remaining vapor. Resulting condensate is withdrawn through line 53 and a portion passed through line 45 as reflux to deisobutanizer 42. Remaining condensate in line 53 is passed to depropanizer 54. Depropanizer 54 comprises a fractional distillation tower operated to remove propane as an overhead fraction and depropanized condensate as a bottoms fraction. The overhead propane is discharged through line 55 for fuel or other use. Depropanized condensate is discharged through line 56. If desired, at least a part of the condensate in line 53 may be by-passed around the depropanizer through line 57, valve 58 and line 59. Condensate in line 56 is passed through throttle valve 65 and line 66 to separator 67 which is maintained at a low pressure effecting flashing of a part of the condensate. Flashing of the condensate affects partial vaporization and concomitant chilling. Chilled liquid is withdrawn through line 2 to contactor 3. If desired, at least a part of the condensate in line 56 may be by-passed around the flash chilling apparatus through line 70, valve 71 and line 72. Vapor separated in separator 67 is passed through line 68 to line 40 where it is combined with the vapors from separator 21 and low pressure deisobutanizer 26 for recompression and recondensation.

*Example*

In the following example, all flow rates are given in barrels of liquid of 42 gallons per hour regardless of whether the stream is in the liquid or the vapor phase. All compositions are given in liquid volume percent.

A hydrocarbon feed stream comprising 30.2 barrels of propylene and 19.2 barrels of butylene from catalytic cracking and 539.8 barrels of isobutane are charged to an alkylation reactor system. The hydrocarbons are contacted in the liquid phase at a pressure of 50 pounds per square inch gage with sulfuric acid maintained at an acidity of 92.0 percent. The reaction mixture is cooled by indirect heat exchange with flashed effluent hydrocarbons. A part of the reaction mixture is withdrawn to a settling zone where the hydrocarbon and acid are separated. Separated hydrocarbon is passed through a throttle valve wherein the pressure is reduced to 2.0 pounds per square inch gage forming a chilled liquid-vapor mixture. The chilled liquid-vapor mixture is passed in indirect heat exchange with the contents of the alkylation reactors effecting evaporation of additional hydrocarbon from the liquid-vapor mixture. The resulting liquid-vapor mixture is discharged to a separator in which is separated 347 barrels of vapor and 375 barrels of the remaining liquid both at a temperature of 35° F.

The separated remaining liquid is passed to a first deisobutanizing fractional distillation zone maintained at a pressure of 12 pounds per square inch gage. Bottoms withdrawn from this deisobutanizer are neutralized and debutanized to produce 85 barrels of alkylate. Vapor overhead from the low pressure deisobutanizer is admixed with the hydrocarbon vapor produced in refrigerating the alkylation zone and compressed to a pressure of 110 pounds per square inch gage resulting in an increase of temperature to 205° F. The hot vapors are passed to a second deisobutanizer maintained at a pressure of 110 pounds per square inch gage. Bottoms from the second deisobutanizer are passed directly to the first deisobutanizer. Overhead vapor from the second deisobutanizer is passed to the reboiler of the first deisobutanizer fractional distillation zone supplying heat by indirect heat exchange with distilland therein and cooling the hot vapors to a temperature of 95° F. thereby effecting partial condensation. The vapors are totally condensed in a water cooler. A part of the condensate is passed as reflux to the high pressure deisobutanizer and remaining condensate is depropanized and recycled to the alkylation zone.

Obviously, many modifications and variations of the invention as hereinbefore set forth may be made without departing from the spirit and scope thereof, and therefore only such limitations should be imposed as are indicated in the appended claims.

I claim:

1. In a catalytic alkylation process wherein isobutane and an alkylatable material are reacted in the liquid phase in the presence of an alkylation catalyst under alkylating conditions in an alkylation zone and lower boiling components of the reaction mixture including isobutane are evaporated under conditions effective for refrigerating said alkylation zone thereby producing an isobutane-rich vapor fraction and a remaining liquid fraction comprising butanes and alkylate, the improvement which comprises compressing said vapor fraction to a pressure within the range of 50 to 150 pounds per square inch gage, passing said compressed vapor to the bottom of a first fractional distillation zone maintained at a pressure within the range of about 50 to 150 pounds per square inch gage, passing said remaining liquid fraction to a second fractional distillation zone maintained at a pressure within the range of about 0 to 50 pounds per square inch gage, compressing overhead vapor from said second fractional distillation zone to a pressure within the range of 50 to 150 pounds per square inch gage and passing thus compressed overhead vapor to said first fractionation zone, passing overhead vapor from said first fractional distillation zone in indirect heat exchange with distilland in said second fractional distillation zone thereby supplying reboiler heat to said second fractional distillation zone and condensing at least a part of said overhead vapor from said first fractional distillation zone forming isobutane-rich condensate, passing at least a part of said isobutane-rich condensate to said alkylation zone, passing bottoms liquid from said first fractional distillation zone to the top of said second fractional distillation zone, and withdrawing deisobutanized liquid from the bottom of said second fractional distillation zone.

2. The process of claim 1 wherein the top tower temperature of said first fractional distillation zone is at least 20° F. above the bottom tower temperature of said second fractional distillation zone.

3. The process of claim 1 wherein said isobutane-rich vapor fraction and said overhead vapor from said second fractional distillation zone are compressed and passed to said first fractional distillation zone in admixture.

4. The process of claim 1 wherein at least a part of said isobutane-rich condensate is flashed effecting partial vaporization and chilling of resulting liquid and vapor, resulting chilled vapor is compressed and passed to said first fractional distillation zone and resulting chilled liquid is passed to said alkylation zone.

5. The process of claim 1 wherein at least a part of said isobutane-rich condensate is depropanized and at least a part of the resulting depropanized isobutane-rich condensate is passed to said alkylation zone.

6. The process of claim 5 wherein said resulting depropanized condensate is flashed effecting partial vaporization and chilling of resulting liquid and vapor, resulting chilled vapor is compressed and passed to said first fractional distillation zone and resulting chilled liquid is passed to said alkylation zone.

7. The process of claim 1 wherein said remaining liquid is passed to the top tray of said second fractional distillation zone.

References Cited in the file of this patent

UNITED STATES PATENTS

| | | |
|---|---|---|
| 2,666,019 | Winn et al. | Jan. 12, 1954 |
| 2,723,940 | Fenske et al. | Nov. 15, 1955 |
| 2,938,061 | Smith | May 24, 1960 |